Oct. 27, 1953 F. GRAY 2,657,377

REPRODUCTION OF SIGNALS FROM MAGNETIC RECORDS

Filed May 25, 1951 6 Sheets-Sheet 1

SINGLE IMAGE

CONTINUOUS IMAGE

INVENTOR
F. GRAY
BY Harry C. Hart
ATTORNEY

Oct. 27, 1953 F. GRAY 2,657,377

REPRODUCTION OF SIGNALS FROM MAGNETIC RECORDS

Filed May 25, 1951 6 Sheets-Sheet 2

INVENTOR
F. GRAY
BY Harry C. Hart
ATTORNEY

INVENTOR
F. GRAY
BY Harry C. Hart
ATTORNEY

INVENTOR
F. GRAY
BY Harry C. Hart
ATTORNEY

INVENTOR
F. GRAY
BY Harry C. Hart
ATTORNEY

Oct. 27, 1953 F. GRAY 2,657,377

REPRODUCTION OF SIGNALS FROM MAGNETIC RECORDS

Filed May 25, 1951 6 Sheets-Sheet 6

INVENTOR
F. GRAY
BY Harry C. Hart
ATTORNEY

Patented Oct. 27, 1953 2,657,377

UNITED STATES PATENT OFFICE 2,657,377

REPRODUCTION OF SIGNALS FROM MAGNETIC RECORDS

Frank Gray, East Orange, N. J., assignor to Bell Telephone Laboratories, Incorporated, New York, N. Y., a corporation of New York Application May 25, 1951, Serial No. 228,246

6 Claims. (Cl. 340—345)

This invention relates to the recording of electric signals in semipermanent two-dimensional pattern records and to the reproduction of such signals from such pattern records for utilization at a later time.

Its general object is to increase the speed with which such records can be made and can be reproduced, as compared with the slow speeds which characterize photographic processes.

This general object is attained by the provision of a special electronic tube, one modification of which acts to convert a signal into a two-dimensional pattern of magnetic conditions on an appropriate medium such as a sheet of magnetizable material, while another modification reconverts this pattern into a reproduction of the original signal. The reconversion takes place by virtue of the influence exerted on the movements of secondary electrons by local magnetic fields which reach into the interior of the tube through a permeable window.

The invention will be fully apprehended from the following detailed description of preferred embodiments thereof, taken in connection with the appended drawings, in which.

Figure 1:
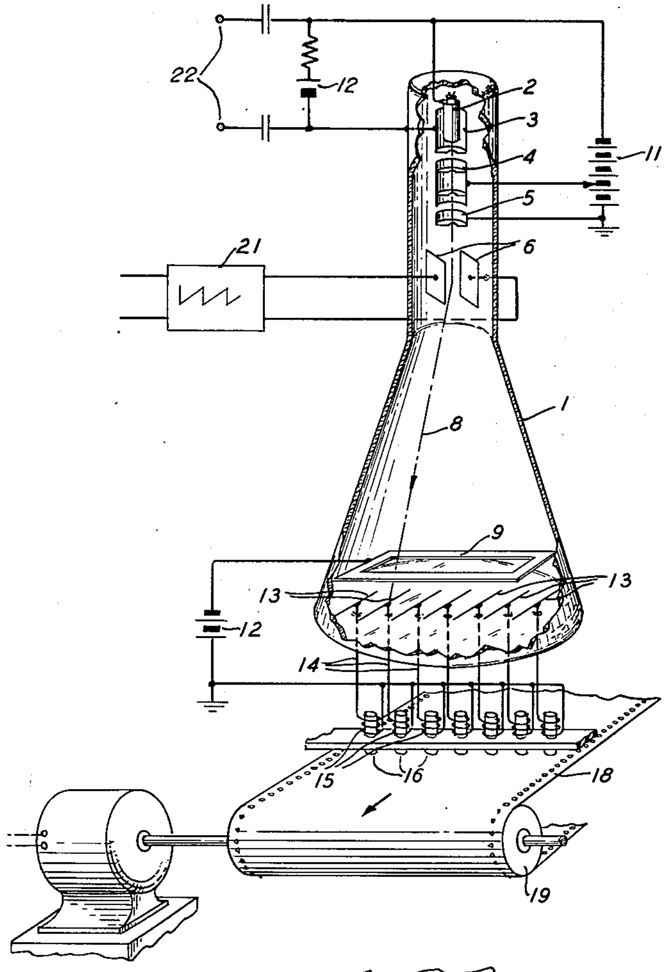
Fig. 1 is a schematic circuit diagram showing apparatus for recording a signal in the form of a space record of magnetic conditions.
Figure 2D:
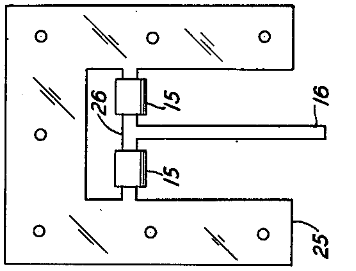
Figure 2C:
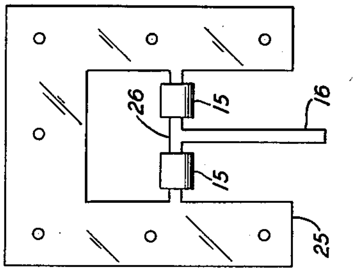
Figure 2B:
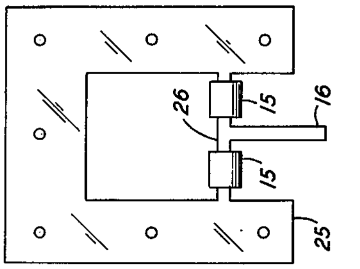
Figure 2A:
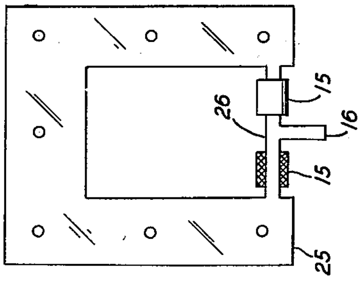
Figure 2F:
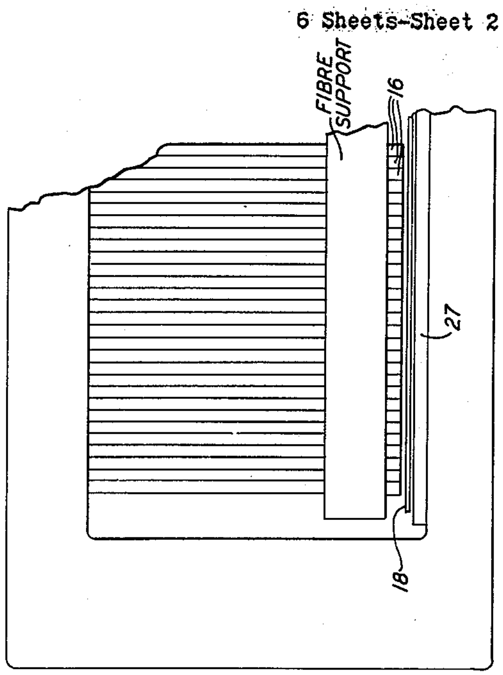
Figure 2E:
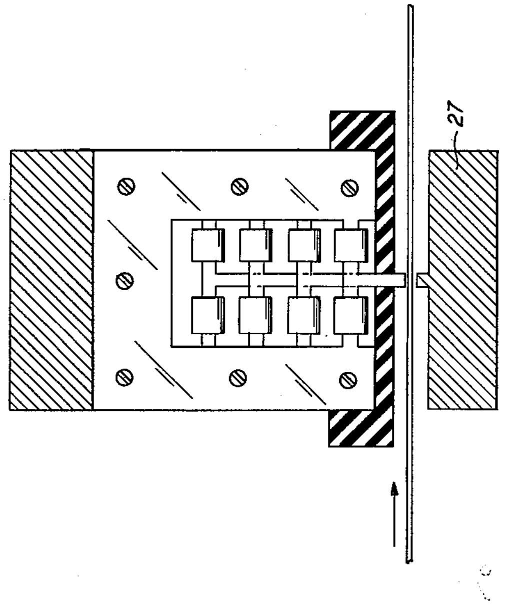
Figure 4:
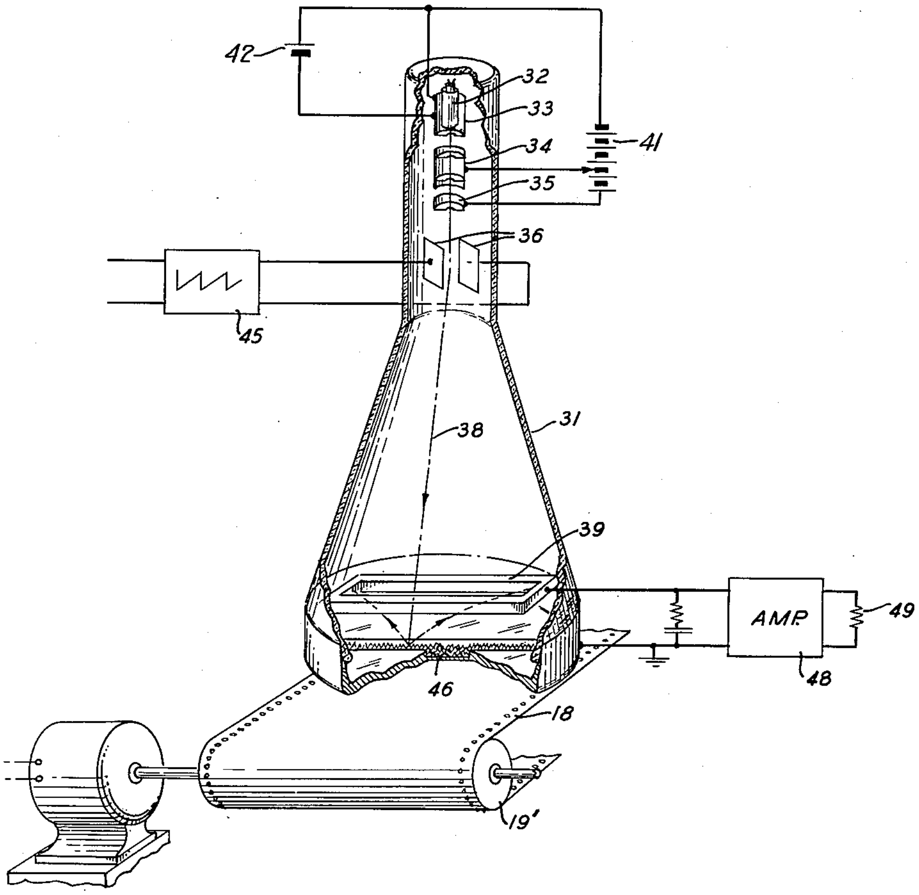
Figure 4A:
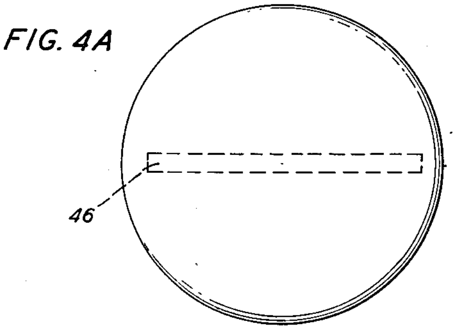
Figure 4B:
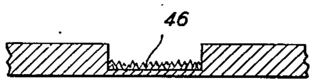
Figure 5:
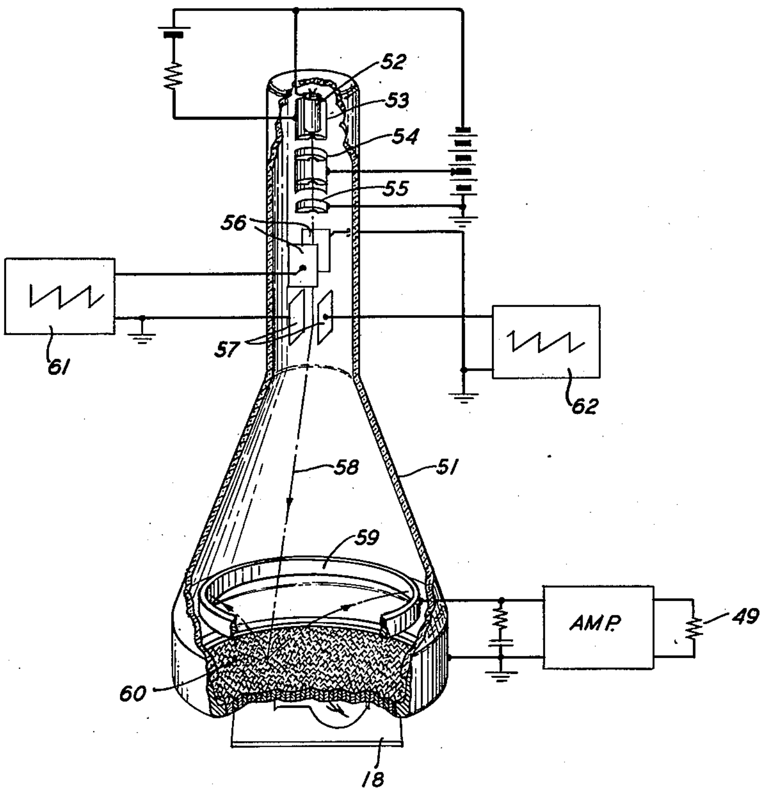
Figure 5A:
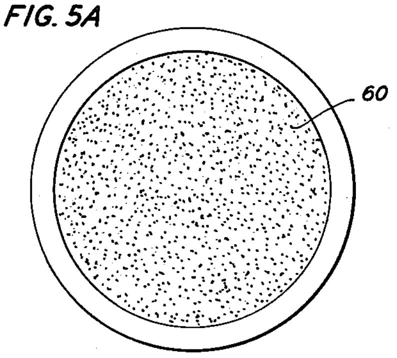
Figure 5B:
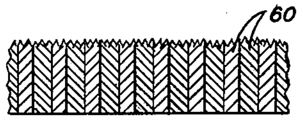
Figure 6A:
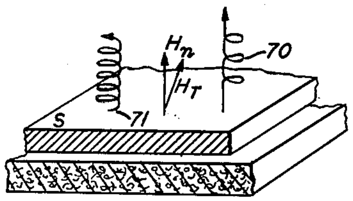
Figure 6B:
Figure 7:
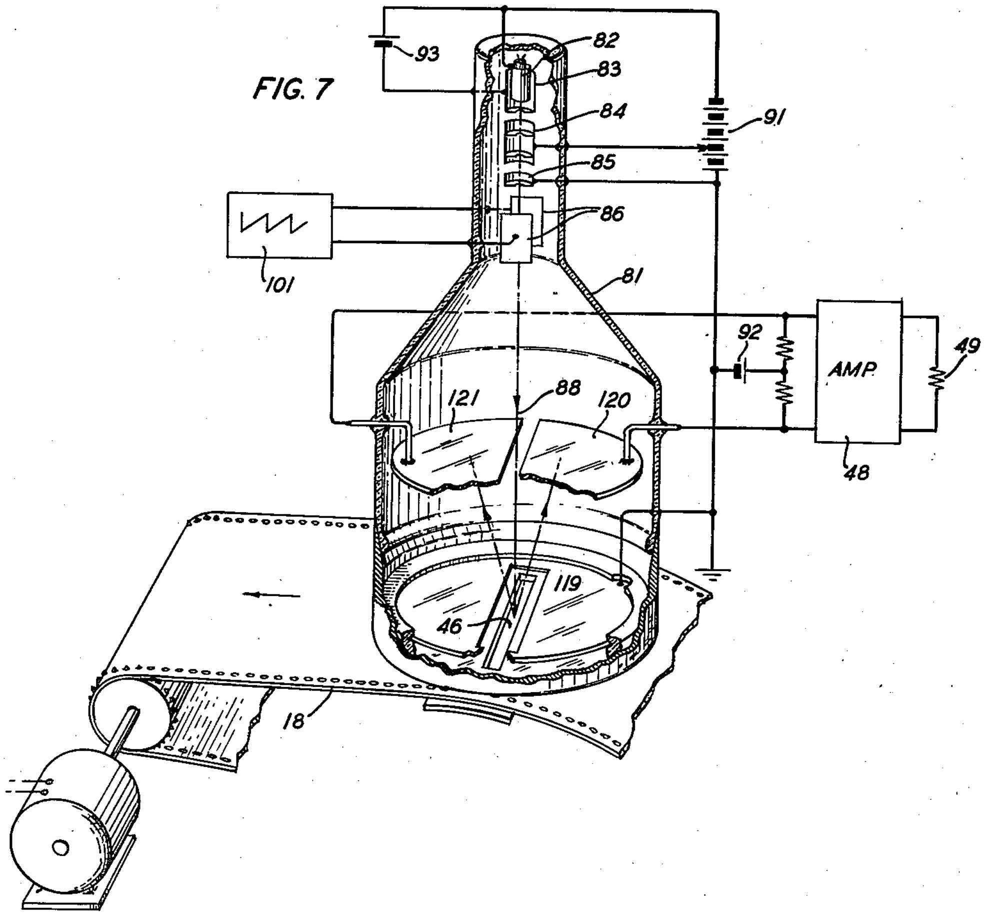

Figs. 2A—2D are diagrams showing the construction of individual laminations for the recording apparatus of Fig. 1;

Figs. 2E and 2F are detailed views showing the stacking together of the laminations of Figs. 2A—2D;

Figs. 3A—3D are diagrams illustrating various types of magnetization for the record of Fig. 1;

Fig. 4 is a schematic circuit diagram showing apparatus for reproducing a signal from a magnetic condition space record;

Figs. 4A and 4B are detailed views of the magnetically permeable window of Fig. 4;

Fig. 5 is a schematic circuit diagram showing alternative reproducing apparatus;

Figs. 5A and 5B are detailed views of the magnetically permeable window of Fig. 5;

Figs. 6A and 6B are diagrams illustrating certain features of the invention; and Fig. 7 is a schematic circuit diagram showing another alternative reproducer of signals from a space record of magnetic conditions.

Referring now to the drawings, Fig. 1 illustrates apparatus of one form for converting an incoming signal into a two-dimensional pattern of magnetic conditions. The apparatus includes a cathode-beam tube comprising an evacuated envelope 1 having therein a cathode 2, a control electrode 3, accelerating and focusing electrodes 4, 5, elements 6 for deflecting the cathode beam 8, a secondary electron collector electrode 9, and operating bias sources 11, 12 for the several electrodes, all of which may be conventional. The enlarged end of the tube 1, located opposite to the cathode 2, is provided with a multiplicity of minute mutually insulated electrodes 13 which are arranged in a row parallel with the direction in which the cathode beam 8 is directed by application of a voltage to the deflecting elements 6. Each of these electrodes 13 is connected by a wire 14 which passes through the tube wall to the winding 15 of a minute electromagnet and then to ground. The cores 16 of the several magnets are arranged in a row transverse to the length of a tape 18 and aligned with a pole-piece, shown in other figures, which completes the flux path. The tape 18 bears on its surface a film of magnetizable material such as iron-oxide powder supported in a suitable plastic or gelatinous binder. This tape may be advanced in the direction of its length by a pulley 19 driven by a motor or otherwise. In operation, the output voltage of a saw-tooth generator 21 is applied to the deflecting elements 6 and causes the cathode beam 8 to sweep successively over the electrodes 13. At the same time, a signal to be recorded is applied by way of conductors 22 between the cathode 2 and the control electrode 3. This modulates the strength of the cathode beam 8 in accordance with the signal. Thus, monetary currents flow through the several windings 15 which are related to the values of the signal at corresponding instants, and the resulting magnetic flux in each core acts to magnetically polarize that part of the magnetizable surface of the tape 18 which at that instant is adjacent to it. In this fashion, a two-dimensional space record is formed of the time-dependent signal applied to the input conductors 22 of the apparatus. The input signal may be an image signal derived, for example, from a facsimile signal generator in which case the pattern of magnetic conditions which is formed on the magnetizable tape 18 is a counter-part of the original image from which the image signal was derived. For this purpose, it is, of course, necessary that the saw-tooth wave generator 21 be synchronized with a corresponding sweep generator at the source. Such synchronization can be accomplished in well-known fashion. If, on the other hand, the incoming signal be a voice signal, then the pattern of magnetic conditions bears no obvious relation to the original voice and may be unintelligible until reconverted into a time-dependent signal in the manner described hereafter.

Figure 1A:
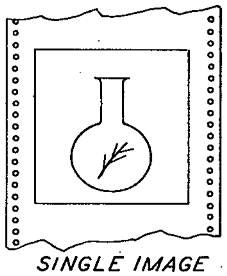
Figs. 1A and 1B are illustrative records made by the apparatus of Fig. 1.
Figure 1B:
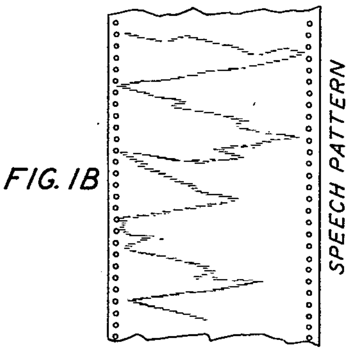

Fig. 1A illustrates a pattern of magnetic conditions corresponding to an image signal, and Fig. 1B illustrates a pattern of magnetic conditions corresponding to a voice signal.

Because the movement of the cathode beam 8 switches the image current onto each one of the several electromagnet windings 15 and off again at a high speed, the current in the winding may tend to oscillate after the beam has passed on, giving rise to a record of spurious magnetic conditions. Such oscillations, however, may easily be suppressed by connecting in parallel with each magnet winding 15 a resistor of value such as critically to damp the circuit.

The auxiliary electrode 9 is shown as being biased to a negative potential. When so biased, it operates to suppress any current of secondary electrons which might be ejected from the target electrode by bombardment by the electrons of the cathode beam. It is equally possible, however, to arrange that the currents through the several magnet windings 15 be themselves due to such secondary electron current. Inasmuch as many materials of which the electrodes may be constructed or with which they may be coated have a secondary electron emission ratio in excess of 2, the currents through the magnet windings 15 may be increased by this approach. To this end, it is necessary that the auxiliary electrode 9 be biased positively with respect to the target electrodes 13 so as to draw away all the secondary electrons produced by bombardment.

Any suitable secondary emissive material may be employed for this purpose, a silver-magnesium alloy being preferred.

To produce magnetic condition patterns of fine detail, it is, of course, necessary that the cores 16 of the several electromagnets be spaced fairly close together. To this end, the windings themselves may be staggered in the manner shown in Figs. 2A, 2B, 2C, 2D. Here, individual laminations 25 are first formed having their crossbars 26 located at various positions. The windings 15 may be placed on the crossbars 26, and the laminations may then be bolted or clamped together in alignment with the common polepiece 27 as shown in Figs. 2E and 2F. With this construction, it is a comparatively simple matter to provide magnet poles 16 which are about five by ten mils in cross sections, each one carrying a coil 15 of 2000 turns of wire without mechanical interference between the coils.

Figure 3A:
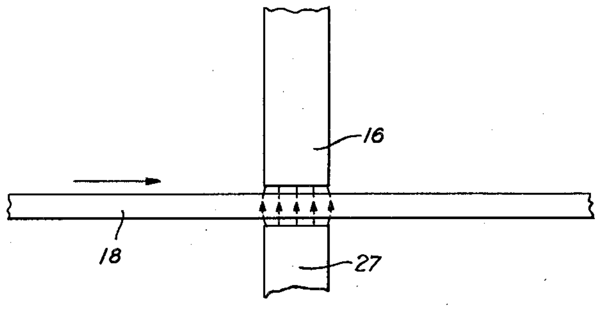
Figure 3B:
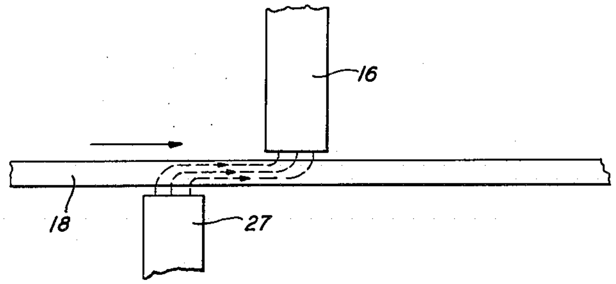
Figure 3C:
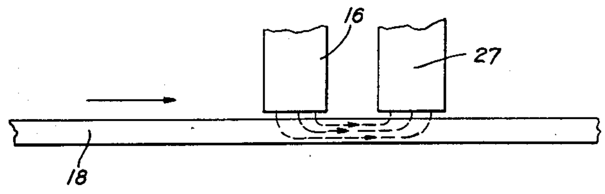
Figure 3D:
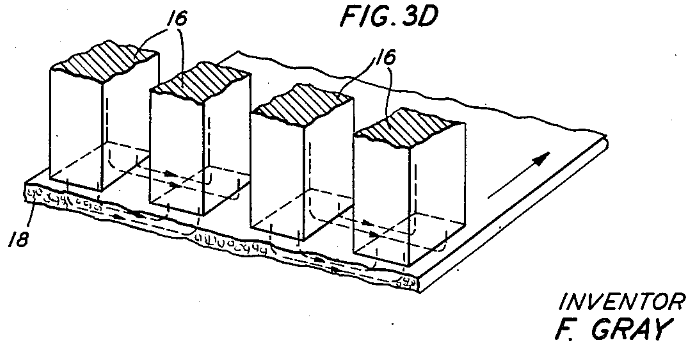

The magnetic pattern produced in this fashion may take various forms in dependence on the manner in which the individual magnet poles 16 are juxtaposed with the magnetizable tape 18 and with the common pole-piece 27. Perpendicular recordings may be had with the arrangement of Fig. 3A in which the pole-pieces 16, 27 are located exactly opposite to each other and operate to magnetize the tape 18 perpendicularly to its surface. A longitudinal magnetic condition pattern may be had with an arrangement of Fig. 3B in which the common pole-piece 27 is displaced, lengthwise of the tape, with respect to the row of individual pole-pieces 16. If preferred, such a longitudinal record can also be obtained by placing the common yoke 27 on the same side of the tape 18 as the individual pole-pieces 16, as shown in Fig. 3C. Fig. 3D shows an arrangement of the pole-pieces 16 which gives rise to a transverse record. Here, the small electromagnets are arranged in pairs, the two coils 15 in each pair being connected in series so that current flows through them in opposite directions. The resulting magnetic flux thus travels downward in one of two paired pole-pieces 16 and upward in the other one, passing transversely through the magnetizable tape 18 in between. With this arrangement, no oppositely located pole-piece is required.

Fig. 4 shows apparatus for reproducing a time-dependent signal from the magnetic pattern space record of Fig. 1. It comprises a tube 31 having a cathode 32, beam focusing and accelerating electrodes 33, 34, 35, elements 36 for deflecting the cathode beam 38, an auxiliary electrode 39, and bias potential sources 41, 42 for the several electrodes, as in the case of Fig. 1. The reproducer tube 31, however, no longer requires a control electrode. In place of the row of magnet electrodes 13 of Fig. 1, the enlarged end of the tube 31 is now provided with a magnetic window which may comprise a thin sheet 46 of copper or other suitable material whose length in one direction is equal to the length of the excursion of the cathode beam 38 in the course of its sweep or, in other words, to the width of the magnetic pattern record 18 to be reproduced, while its width in the other direction is only as great as the width of the cathode beam 38 itself. Such a construction permits the use of a window of an exceedingly small thickness dimension without danger of rupture under the atmospheric pressure external to the tube. The inside wall of this window 46 is provided with a secondary emissive surface of any suitable material and is preferably roughened in addition, as indicated in enlarged cross section Fig. 4B. The grain size and the significance of this roughening will be described below. A positive potential is applied to the auxiliary electrode 39 so as to withdraw secondary electrons produced by bombardment of the inside face of the window 46 by the electrons of the cathode beam 38. An output circuit of any suitable variety, which may include an amplifier 48 and a load 49, is connected between this auxiliary electrode and ground. A saw-tooth voltage generator 45 which may be the same as that of Fig. 1 is connected to the beam-deflecting elements 36.

The tape 18 bearing the pattern of magnetic conditions produced by the apparatus of Fig. 1 is led past the window 46 in a direction parallel to its width by a motor-driven pulley 19' or otherwise.

In operation, the saw-tooth voltage applied to the deflecting plates 36 causes the beam 38 to travel at approximately constant speed from one end of the window 46 to the other and then rapidly to jump back to its starting point to repeat the operation. From each point of the inside face of the window 46 impinged by the primary electrons of the cathode beam 38, secondary electrons are ejected. The localized magnetic fields of the magnetic pattern recorded on the tape 18 reach through the window 46 to its inner surface where they modify the movements of these secondary electrons. As the beam 38 moves along the length of the window 46 from one end to the other, the resulting variation of the current of the secondary electrons, which is picked up by the electrode 39 and applied to the utilization circuit 48, 49, reflects the sequence of magnetic conditions which are met in passing from one side of the tape to the other at that part of its length which is in contact with the permeable window 46. Similarly, on the next sweep of the beam, the tape has advanced approximately by the width of the window so that a new pattern of magnetic conditions reaches through the window to modify the secondary electron current. Thus, the secondary electron current in the utilization circuit varies in accordance with the details of the pattern of magnetic conditions recorded on the tape, and the output current constitutes a reproduced pattern current.

The sensitivity of the inner face of the window may be of different kinds. Electrical conditions may be so arranged that the secondary current is limited by space charge effects, in which case the presence of a magnetic field reduces the current by increasing the space charge. Again, the surface may be roughened on its inner face so that the magnetic field causes electrons ejected from one part of the surface to reenter some other part of the same surface. Such electrons are taken out of circulation, so to speak, with the result that the current of secondary electrons is reduced in the presence of the localized magnetic field due to the pattern recorded on the tape. These effects are discussed in greater detail below.

In some circumstances, it is desirable to reproduce a pattern current from a space record without resorting to any mechanical movement such as that of the tape of Figs. 1 and 2. This is especially so in situations in which a magnetic condition pattern is confined to a limted area on a sheet of paper or the like and current from this pattern must be automatically reproduced from time to time on demand. Such is the case when pulse signals and the current from brief speech patterns are employed for any purpose in an automatic system. It is also the case when an image is to be reproduced on a screen with a television projector.

In answer to the need for such a reproducer, the apparatus of Fig. 5 is provided. Here, the electrode structure of the beam tube 51 may be the same as that of Fig. 4 with the exception that it is provided with an additional pair of deflecting elements 57, while the wall of the enlarged end of the tube 51 is a mosaic of small high-permeability paths, magnetically isolated from each other by low-permeability material. For example, the end wall may comprise a mosaic 60 of minute iron wires embedded in a softer metal such as tin. (Figs. 5A and 5B). The mosaic structure is cut into the form of a thin metal plate and sealed across the end of the tube. It constitutes an end wall having a high magnetic permeability in the direction perpendicular to its surface and much lower permeability parallel with its surface. The paper or tape 18 bearing its magnetic condition pattern is pressed against this wall of the tube, and the localized magnetic fields which constitute the pattern pass through the wall and indicate their presence on the inside surface of the wall by modifying the current of secondary electrons which are produced by bombardment of this surface by the primary electrons of the cathode beam and drawn from the sensitive surface to the collector 59.

By application of a rapid sweep voltage from the source 61 to one pair of deflecting plates 56 and a slower sweep voltage from another source 62 to the other pair 57, the beam 58 is caused to trace over the end of the tube a series of parallel paths, much as in the case of a television image reproducer. Secondary electrons are ejected from each spot of the window on which the beam is impinging at any instant, and these secondary electrons are drawn away to the auxiliary electrode and constitute the output current of the tube. But the flow of these secondary electrons is controlled by the localized magnetic fields in the space pattern on the tape which at that instant is bearing against that particular spot of the window 60, and the beam thus reproduces the pattern current as the spot traces over the end of the tube.

Coming now to the mechanism by which the magnetic condition pattern modifies the secondary electron current and to the significance of the various structural features proposed above, for example, the roughening of the inside surface of the window 46 or 60, it will be understood that, as long as the window is sufficiently thin and sufficiently permeable to a magnetic field and as long as the paper or tape 18 which bears such a pattern of magnetic conditions is placed snugly against its outside wall, localized magnetic fields will appear at its inside surface. In general, such inside surface fields will comprise two components, a normal component and a tangential component. The distribution of field strength as between these components depends in part on the manner in which the original record was made, i. e., by normal magnetization, by longitudinal magnetization, or by transverse magnetization. Whatever the ratio of the strengths of these two components may be, it is of minor importance because they both contribute to the results in the following way.

The tangential component of the magnetic field, when it is present, causes secondary electrons to travel along cycloidal paths 70 as illustrated in Fig. 6A. This reduces the velocities of the secondary electrons in the direction away from the surface of the window 46 or 60 and so causes a resulting increase in space charge and a reduction in the magnitude of the secondary electron current to the collector 39 or 59. This effect is independent of whether or not the surface of the window 46 or 60 has been roughened or is perfectly smooth. A normal component of magnetic field, when present, causes each secondary electron to revolve in an orbit parallel to the surface of the window, travelling away from the point of its origin along a spiral path 71. The orbital component of motion causes no reduction in its velocity away from the surface and so causes no modification in the secondary current from a smooth surface. However, when the surface has been roughened in the manner described above, then, as illustrated in Figs. 4B and 5B and on a greatly enlarged scale in Fig. 6B, a secondary electron which is ejected from a side wall of a pore tends to re-enter the same wall or a nearby wall as a result of its orbital motion. If it does so re-enter the surface, it is removed from circulation and so represents a reduction of the secondary current. The impact velocities of these secondary electrons are, of course, much too low to cause ejection of tertiary electrons.

Taking into account the fineness of detail of the magnetic condition pattern as above described and the degree of resolution which is obtainable for cathode beams with modern techniques, it has been found that the index of roughness of the inside surface of the window should be of the order of 30 mils; that is to say, the average over the surface of the distances, measured parallel to the surface, of each high point from its nearest neighbor should be about 30 mils.

For optimum sensitivity of the apparatus to local variations in the secondary electron current, the auxiliary electrode 9, 39, or 59 is preferably placed very close to the source of the secondary electrons. It may consist of a fine grid of wires placed exceedingly close to the surface; that is to say, within a fraction of a millimeter of it. With this construction a suitable secondary electron collecting voltage may be zero or even slightly negative, secondary electrons being carried to this auxiliary electrode by virtue of their initial ejection velocities alone.

There is one sense in which transverse magnetization of the magnetic condition record is superior both to longitudinal magnetization and to normal magnetization, and that is that a reversal of the direction of the magnetic field which penetrates through the window to its inner surface gives rise not only to a change in the magnitude of the secondary electron current but also to a reversal in the direction of the tangential component of the motion of the secondary electrons. In accordance with the invention, advantage is taken of this feature by the provision and construction of a reproducer tube which is sensitive to the direction of movement of the secondary electrons as well as to the magnitude of the secondary electron current. Such a reproducer is shown in Fig. 7. It comprises an evacuated envelope 81 containing a cathode 82, beam accelerating and focusing electrodes 83, 84, 85, beam-deflecting elements 86, and potential bias sources 91, 92, 93 for the electrodes as before. The principle embodied in this construction may be applied to a tube in which the surface is extended in both directions as in the case of Fig. 5. However, these principles are more simply illustrated by a tube having a window 46 which is extended in only the one direction of the beam sweep as indicated in Fig. 4. In place of the single secondary electron collecting electrode 39 of Fig. 4, there are provided an apertured anode 119 which assists in drawing the secondary electrons away from the surface of the window 46 and a pair of secondary electron targets 120, 121 which are insulated from each other and to which are connected the terminals of the output utilization circuit 48, 49. The tape 18 bearing the transverse magnetic condition record may be drawn past this window in a direction perpendicular to its longest dimension as indicated in Fig. 4, and the tape advancing mechanism, not shown in Fig. 7, may be similar. When the cathode beam 88 impinges on any particular area of the window 46, it causes that area to emit secondary electrons. The stream of secondary electrons is drawn away from the window by the apertured anode 119 and projected back along the axis of the tube 81 to one or the other of the two secondary targets 120, 121.

As the primary electron beam 88 sweeps along the length of the window 46 in the course of each scan, the point of impact of this beam on the window, which is the instantaneous point source of secondary electrons, moves along and so passes through localized magnetic fields which penetrate the window 46 from the transversely magnetized tape 18 on the other side of it. These localized fields are successively of opposite polarities so that the secondary electron stream is deflected by these successive localized fields in successively different directions. Magnetization of the tape 18 in one direction causes deflection of the secondary electron beam toward one of these targets, and magnetization of the tape in the opposite direction causes similar deflection of the secondary beam toward the other of these targets. Thus, even without alteration in the strength of the secondary electron current as a whole, there is caused with each reversal of the direction of magnetization in the tape 18 an increase of the current to one of the targets 120 and a decrease of the current to the other target 121 or vice versa. By virtue of the connection of these two targets in push-pull to the terminals of the utilization circuit 48, 49, the effect of this construction is to generate in the utilization circuit a current which reproduces as a time-dependent signal a space pattern recorded on the tape.

The potentials and dispositions of the anode 119 and the targets 120 are preferably such that a fairly strong electric field exists between the anode 119 and the window 46, so that a substantial fraction of the ejected secondaries are drawn away, while the space between the anode 119 and the targets 120 is substantially field-free.

What is claimed is:

1. Apparatus for reproducing an electric signal from a magnetic condition space pattern record thereof which comprises an evacuated envelope, means within said envelope for projecting a cathode beam, beam-receptive means sealed into a wall of said envelope in position to be impinged by said beam, said beam-receptive means comprising a window which is permeable to magnetic flux, the inside face of said window having secondary electron emission properties, a magnetic condition space pattern record disposed in magnetizing relation with the exterior face of said window, means for causing said cathode beam to impinge successively on different areas of said window to eject from each of said different areas secondary electrons in dependence on the magnetic condition of that part of said space pattern record which is instantaneously exterior to said area of the window, means for collecting said secondary electrons, a utilization circuit, and means for supplying the secondary electrons so collected to said utilization circuit.

2. Apparatus for reproducing an electric signal from a magnetic condition space pattern record thereof which comprises an evacuated envelope, means within said envelope for projecting a cathode beam, beam-receptive means sealed into a wall of said envelope in position to be impinged by said beam, said beam-receptive means comprising a window which is permeable to magnetic flux, the inside face of said window having secondary electron emission properties, a magnetic condition space pattern record disposed in magnetizing relation with the exterior face of said window, means for causing said cathode beam to impinge on the inside face of said window to eject secondary electrons therefrom in dependence on the magnetic condition of that part of said space pattern which is instantaneously exterior to said window, a utilization means, means for collecting secondary electrons ejected from said window, and means for supplying the secondary electrons so collected to said utilization means.

3. Apparatus as defined in claim 2, wherein the interior face of the window is provided with a multitude of minute, inwardly projecting protuberances which are spaced from each other by minute depressions.

4. Apparatus as defined in claim 2, wherein the record is transversely magnetized, wherein the secondary electron collecting means comprises a pair of symmetrically located targets, wherein the utilization means is a balanced circuit having two input terminals, and wherein each of said targets is connected to one of said terminals.

5. Apparatus for reproducing an electric signal from a magnetic condition space pattern record thereof which comprises an evacuated envelope, means within said envelope for projecting a cathode beam, beam-receptive means sealed into a wall of said envelope in position to be impinged by said beam, said beam-receptive means comprising a window which is permeable to magnetic flux, the interior face of said window having secondary electron emission properties, a magnetic condition space pattern record disposed in magnetizing relation with the exterior face of said window, thereby to establish a distribution of magnetic fields on the interior face of said window, means for causing said cathode beam to scan said window, thereby to eject from each area thereof secondary electrons in dependence on said magnetic fields, a utilization circuit, means for collecting secondary electrons ejected from said window, and means for supplying the secondary electrons so collected to said utilization circuit.

6. Apparatus for reproducing an electric signal from a magnetic condition space pattern record thereof which comprises an evacuated envelope, means within said envelope for projecting a cathode beam, beam-receptive means sealed into a wall of said envelope in position to be impinged by said beam, said beam-receptive means comprising a window which is permeable to magnetic flux, the interior face of said window having secondary electron emission properties, a space pattern record of magnetic conditions arranged in opposite-polarity pairs disposed in magnetizing relation with the exterior face of said window, thereby to establish a distribution of transverse magnetic fields on the interior face of said window, means for causing said cathode beam to scan said window, thereby to eject from each area thereof secondary electrons in dependence on said magnetic fields, means establishing an electric field of substantial magnitude normal to said interior window face and in its immediate vicinity, for withdrawing said secondary electrons, a pair of targets, a field-free region between said electric field-establishing means and said targets, and a utilization circuit having two terminals, each of said targets being connected to one of said terminals.

FRANK GRAY.

References Cited in the file of this patent

UNITED STATES PATENTS

| Number | Name | Date |
|---|---|---|
| 2,046,328 | Kleinschmidt et al. | July 7, 1936 |
| 2,165,307 | Skellett | July 11, 1939 |
| 2,419,195 | Begun | Apr. 22, 1947 |
| 2,496,441 | Camras | Feb. 7, 1950 |